UNITED STATES PATENT OFFICE.

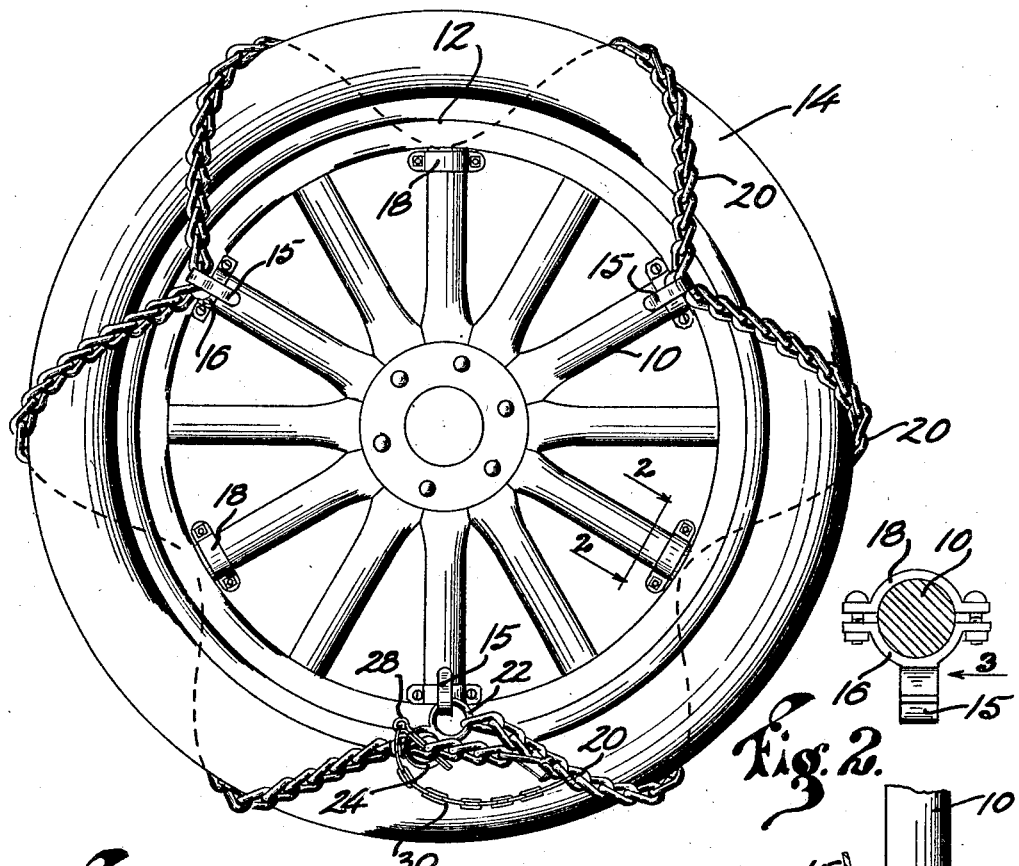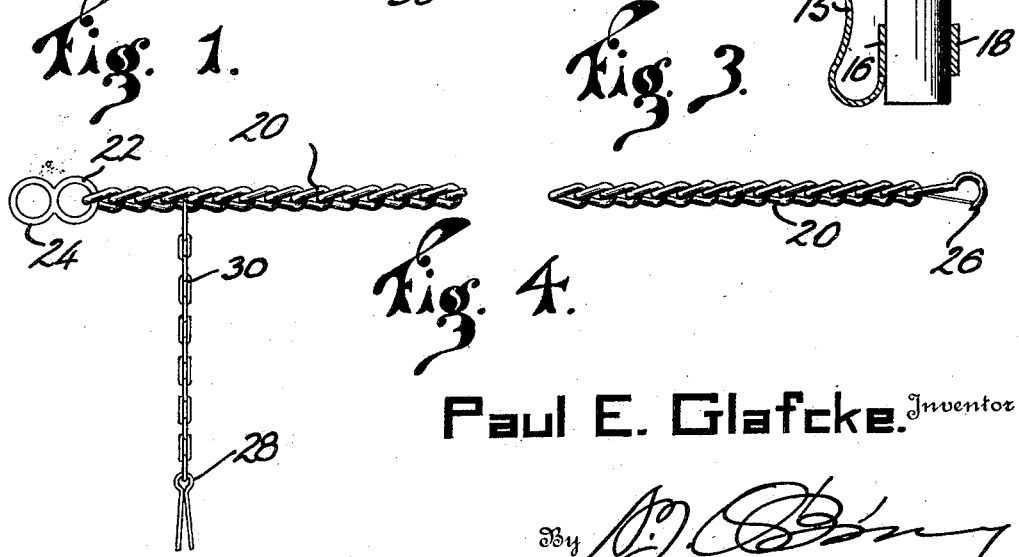

PAUL EMERSON GLAFCKE, OF CHEYENNE, WYOMING.

NONSKID DEVICE.

1,402,855.    Specification of Letters Patent.    Patented Jan. 10, 1922.

Application filed February 21, 1920. Serial No. 360,287.

*To all whom it may concern:*

Be it known that I, PAUL E. GLAFCKE, a citizen of the United States, residing at Cheyenne, county of Laramie, and State of Wyoming, have invented certain new and useful Improvements in Nonskid Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to devices for attachment to automobile wheels to prevent skidding.

The object of the invention is to reduce the time required in attaching a nonskid device, to the minimum, and to reduce the cost of the device.

Heretofore, in applying the nonskid devices now on the market, it has been necessary to spend considerable time in laying out the attachment and in either jacking up the wheel, or in backing the car on the attachment. With the present structure, jacking up of a wheel, or moving of a car is not necessary. The chain employed can be draped back and forth in zig-zag fashion over the tire and connected with the wheel very rapidly, and may be applied even in the dark.

The device comprises a single length of chain in combination with devices for connecting it at different points preferably with certain of the spokes of the wheel, and means for securing the ends of the chain.

In the drawing:

Fig. 1 shows a wheel with the invention applied thereto.

Fig. 2 is a detail section on the line 2—2, Fig. 1, showing a hook on one of the spokes.

Fig. 3 is a detail indicated by the arrow 3 of Fig. 2.

Fig. 4 shows the chain in outstretched position.

The drawing shows spokes 10 of a wheel, having a rim 12, to which is applied a tire 14. As indicated on Fig. 1, hooks 15 are applied to alternate ones of the spokes 10, the hooks 15 being arranged alternately on opposite sides of the wheel. Each hook 15 is mounted on one semi-circular part 16 of a clamp and is bolted to a similar part 18, as shown in Fig. 2, thus securing the hook on the respective spoke 10. A single length of chain 20 is provided at one end with a double member having two eyes 22 and 24, while the opposite end of the chain is provided with a snap-hook 26. Adjacent to the eyes 22 and 24 a cotter key 28 is connected with the chain 20 by means of a short length of small chain 30. This form of the invention is applied to the wheel by passing the eye 22 over one of the hooks 15. The chain is then passed across the tire to the opposite side and into the next hook 15. The hooks 15 have their ends of such length and so curved that they will readily retain the chain therein in case any slack develops in the chain. The chain is then draped in zig-zag fashion back and forth across the tire from one side to the other, being placed in the respective hooks 15 until the point of beginning is reached. The end of the chain and the snap-hook 26 are then drawn through the eye 24 until the chain is as snug as desired. The cotter key 28 is then passed through that link of the chain 20 which just protrudes through the eye 24, thereby determining the position of the end of the chain at this point.

To prevent any surplus length of the chain from swinging, the snap-hook 26 is hooked into another link of the chain 20, as indicated in Fig. 1.

From the foregoing it will be seen that the chain is passed across the tire at points off of the ground so that jacking up of the wheel is avoided. It will also be seen that the chain may be quickly applied, either in daylight or after dark, and of course may be as quickly removed.

Much time is saved in applying the device, and considerable cost in construction is also saved. The chain also may be used for a tow line whenever occasion arises requiring such equipment.

I claim—

1. In combination, a wheel having spokes and a tire, hooks connected directly to certain of said spokes, and a long flexible nonskid member draped back and forth across said tire in ziz-zag fashion and having intermediate portions thereof slidably received in said hooks on opposite sides of the wheel, one end of said chain being nonslidably connected with one hook, said end having an eye thereon receiving the other end of the chain, and means to secure said other end in said eye.

2. In combination, a wheel having spokes and a tire, hooks connected directly to certain of said spokes, and long flexible non-skid member draped back and forth across said tire in zig-zag fashion and having intermediate portions thereof slidably received in said hooks on opposite sides of the wheel, one end of said chain being non-slidably connected with one hook, by means of a double ring, one ring being connected directly to the end of the chain and to one of said hooks, the other end of said chain passing through said other ring, and being provided with a hook for engagement with said ring carrying end, and carried by the chain for securing said other end to said other ring whereby relative movement of said chain and ring will be prevented.

In testimony whereof I affix my signature.

PAUL EMERSON GLAFCKE.